Nov. 24, 1959 S. E. FARMER ET AL 2,914,368
SEAL CONSTRUCTION FOR PISTON-CYLINDER FLUID MOTORS
Filed May 16, 1958

INVENTOR.
STANLEY E. FARMER
ZOUHDI M. DERHALLI
BY
Ramsey and Kolisch
ATTYS.

United States Patent Office 2,914,368
Patented Nov. 24, 1959

2,914,368

SEAL CONSTRUCTION FOR PISTON-CYLINDER FLUID MOTORS

Stanley E. Farmer and Zouhdi M. Derhalli, Portland, Oreg., assignors to Cascade Manufacturing Company, Portland, Oreg., a corporation of Oregon Application May 16, 1958, Serial No. 735,868

4 Claims. (Cl. 309—31)

This invention relates to piston-cylinder seals, and more particularly to a seal construction for piston-cylinder fluid motors wherein the piston of the device is sealed tightly to the inner wall of its cylinder portion.

Piston-cylinder motors or jacks are used extensively for moving a part by means of hydraulic pressure. Such a motor includes some sort of seal construction between the movable piston element and the cylinder or shell, sealing the two parts in fluid tight relationship. Certain applications require an essentially completely positive seal, as when the fluid motor is used to position a part such as a clamping arm, and it is then desired to lock hydraulically the arm in place. In this instance, if leakage occurs around the piston of the piston-cylinder, the clamping arm tends to drift away from its set position with relaxation of clamping pressure.

Double acting sealing rings, that is, rings operable to seal two surfaces together with pressure fluid applied in either of two opposite directions, have been used quite successfully between surfaces which are stationary with respect to each other, and between relatively movable surfaces under certain conditions. A common example of such a double acting ring is the well-known O-ring which has a substantially circular cross section, and a ring such as the "Quad" ring produced by Minnesota Rubber which has a cross section resembling the leaf pattern of a four-leaf clover with an enlarged circular center. These types of rings are easy to install, inexpensive, and are available in a large selection of sizes.

In ordinary commercial installations where cycling of a motor occurs frequently, double acting rings heretofore have not been too successful. Commonly fluid motors are actuated by an unfiltered hydraulic system with the result that small particles of foreign matter become suspended in the hydraulic fluid. These particles lodge between the contact or wear surface of a piston and the cylinder wall, producing scoring of the wall. Unlike certain other rings, such a Chevron ring, an O-ring wears rapidly on traveling over a scored surface, and thus rapid failure results. Attempts have been made to alleviate the problem by the use of two O-rings, one on each side of the wear or contact surface of a piston. In this type of construction a wiping of the cylinder surface occurs before the piston wear surface travels over the cylinder surface, and thus scoring is materially reduced. However, under operative conditions, O-rings tend to roll and produce a pumping action during cycling of a motor, so that a build-up of fluid pressure occurs between the O-rings. This fluid pressure build-up causes permanent distortion of the rings during cycling of the motor resulting in excessive wear.

This invention contemplates a spaced, double ring, seal construction for fluid motors wherein the rings are spaced apart on either side of a piston contact or wear surface in position to wipe the inner surface of a cylinder before the piston contact surface travels thereover. Relief passage means is provided operable to bleed from the area located between the rings any fluid under pressure introduced between the rings by reason of the rolling of the rings. The rings and relief passages are so organized that substantially no leakage occurs from the pressurized side of a piston-cylinder to the nonpressure side, which, as indicated above, is highly important. The rings in this respect function as part of a valve system for the relief passage means. Motors constructed as contemplated herein have been cycled thousands of times using unfiltered hydraulic systems, with substantially no destruction of the sealing rings, and with no perceptive leakage occurring from the pressurized to the nonpressurized sides of the motor.

An object of the invention, therefore, is to provide a piston and seal construction for a piston-cylinder fluid motor which is economically and simply constructed, but which is highly satisfactory for ordinary operating conditions requiring repeated cycling of the motor.

A more specific object is to provide a seal construction comprising a pair of spaced double acting seals, wherein novel means is provided for bleeding fluid pressure build-up tending to occur between the seals.

Another object is to provide a positive seal construction for a piston-cylinder motor, wherein the motor cylinder wall is effectively wiped by spaced O-rings located on either side of a piston wear or contact surface, and wherein the O-rings also function as part of a valved relief system to bleed fluid pumped into the space between rings.

These and other objects and advantages are attained by the present invention, which is described hereinbelow in conjunction with the accompanying drawings wherein.

Figure 1:
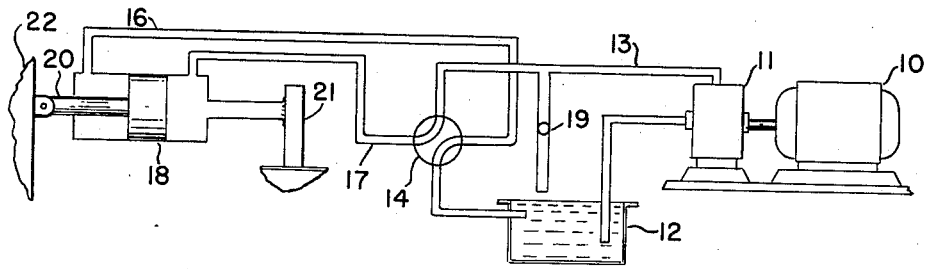
Fig. 1 is a schematic view illustrating a piston-cylinder motor of the type contemplated, as it might be connected for moving a clamping part, wherein the part may be hydraulically locked in adjusted positions.

Referring now to the drawings, and more particularly to Fig. 1, 10 indicates a motor driving a pump 11 which draws fluid from reservoir 12 and pumps the fluid under pressure through conduit 13 to a conventional control valve 14. Valve 14 is adjustable either to admit fluid under pressure through a conduit 16 to one side of a piston-cylinder or jack 18, or through a conduit 17 to the other side of the piston-cylinder. The valve may also be positioned to lock hydraulically the piston-cylinder in a fixed position. Valve 19 is a relief valve. In the installation illustrated, a rod 20 connected to the piston portion of the piston-cylinder is connected to and moves a movable work element 22. The cylinder portion of the motor is fixed to frame 21. The construction so far described is conventional, and representative of an application where leakage from one side of the piston-cylinder to the other should be eliminated as much as possible.

Figure 2:
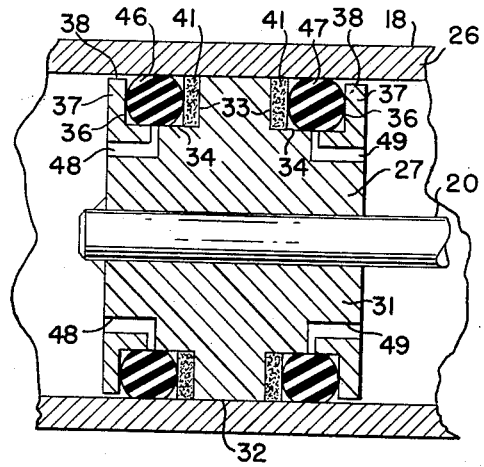
Fig. 2 is an enlarged, section view of the piston-cylinder motor of Fig. 1, illustrating a pair of spaced sealing rings providing a seal between the piston body and the inner wall or surface of the cylinder shell.
Figure 3:
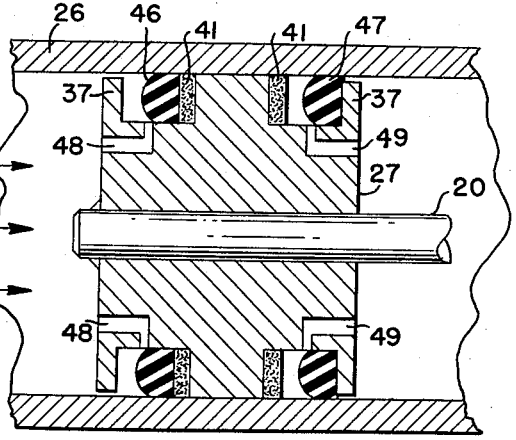
Fig. 3 illustrates the deformation occurring in the sealing rings when the piston is urged by hydraulic fluid pressure in one direction.
Figure 4:
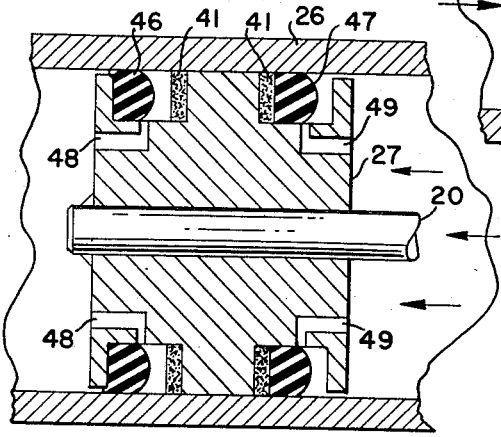
Fig. 4 resembles Fig. 3, save that the piston is being urged, or traveling, in the opposite direction.

With reference now to Figs. 2, 3, and 4, piston-cylinder 18 comprises a cylinder or shell portion 26, and a piston portion 27. The latter is secured as by welding to rod 20 which projects through one of the closed ends of cylinder 26. The specific details of the ends of piston-cylinder 18 are not illustrated, as these details form no part of this invention.

Piston 27 comprises a metal body 31, of generally cylindrical outline. Extending circumferentially around the piston body intermediate axially opposite sides thereof is a cylindrical contact or wear surface 32. This contact surface curves about a radius which is only slightly less than the radius of curvature of the inner wall or surface of cylinder 26. In operation, surface 32 centers the piston within the cylinder shell.

Formed in the piston body axially outwardly of and to each side of contact surface 32 is a radially extending side wall 33 joined at its base with a circumferential bottom wall 34. The axially outer edge of each wall 34 meets a radial side wall 36. Each set of walls 33, 34, 36 define an annular groove extending around the piston body.

Each side wall 36 joins at its radially outer edge with a circumferential wall or surface 38. Walls 38 curve about a radius which is less than the radius of curvature of wall 32. Consequently walls 38 rid up and down in the cylinder out of contact with the inner wall of the cylinder.

Mounted against each side wall 33 (the axial inner side wall), one on one side and one on the other side of contact surface 32, is a conventional, flat-faced backup ring 41. Each ring has a radial outer peripheral edge which rides snugly against the inner surface of the cylinder. The rings are made of pliant and somewhat flexible material, and are included for the purposes of preventing extrusion of sealing rings placed thereagainst into the space or clearance between wall 32 of the piston and the inner wall of the cylinder shell. Backup rings are not essential with low pressure systems, however, they are ordinarily used with high pressure systems. Conventionally the backup rings may be made of leather, or suitable synthetic material.

The axially outer face of each ring 41, together with wall 34 and wall 36 of the groove mounting the backup ring, define a sealing ring retaining groove for the piston, one being located on each side of wall 32. Mounted in each ring retaining groove is a double acting sealing ring. In the embodiment illustrated, the sealing ring takes the form of a ring having a circular cross section, and is made of flexible and resilient material such as rubber or a synthetic. This type of ring is commonly known in the industry as an O-ring. The sealing rings are indicated at 46, 47.

In order to produce a tight seal, each ring has a radially inner diameter which is slightly less than the diameter of wall 34, and a radially outer diameter which is slightly greater than the diameter of the inner wall of cylinder or shell 26. Thus a tight sealing engagement occurs at radially opposite sides of the ring (with wall 34 and the inner surface of the cylinder, respectively). Since each ring has approximately a circular cross section, this sealing engagement takes place at points spaced centrally between axially opposite sides of the ring, or at points spaced axially outwardly from the axially inner side of a ring a distance equal approximately to the radius of the cross section of the ring.

Connecting each sealing ring retaining groove and the side of the piston adjacent the groove, and spaced circumferentially at regular intervals about the piston body, are a series of relief passages which are indicated at 48 for one side of the piston, and at 49 for the other side. The relief passages of a groove have inlet ends which communicate with the groove at points where the O-ring for the groove is in sealing engagement with the groove bottom wall, when the O-ring is in a relaxed state. The O-ring thus normally closes these inlet ends. This requires that the inlet ends be spaced from the axially inner side wall of a ring retaining groove (or the axially outer face of a backup ring) a distance equal to the axial spacing between the axially inner side of a sealing ring and the sealing radial inner surface thereof. In O-rings this distance is equal substantially to the radius of the cross section of the ring.

Referring now particularly to Figs. 3 and 4, the parts of the seal construction are shown as they deform during use. With reference to Fig. 3, the arrows indicate the direction of travel of the piston under the urging of fluid pressure introduced to the left side of the piston-cylinder. The introduction of pressure fluid causes the left-hand sealing ring 46 to move tightly against a backup ring 41. Ring 46, when positioned over the inlet ends of the relief passages, originally sealed off these inlet ends to prevent the admission of fluid to the space between sealing ring 46 and its backup ring. When ring 46 moves off these inlet ends of the passages, the passages communicate with a void spaced axially outwardly of ring 46, and the ring continues to seal off this space.

Any pressure fluid build-up occurring between the O-rings by reason of the rolling of the rings during cycling of the piston causes right-hand ring 47 in Fig. 3 to move from left to right as shown. When this occurs the O-ring moves off the inlet ends of passages 49 and an exhaust is provided for any fluid pressure between the O-rings. Relief passages 49 open up before the O-ring is extruded to any appreciable extent into the space between the outer edge of flange 37 and the inner surface of shell 26.

Fig. 4 shows a reverse condition of the parts. In this instance, O-ring 47 has moved from right to left under the urging of pressure fluid admitted to the right-hand side of the piston-cylinder. Fluid is prevented from flowing up through passages 49 into the space between backup rings 41 and O-ring 47 in the same manner as discussed in connection with Fig. 3 and O-ring 46. O-ring 46 moves from right to left under the influence of a pressure build-up occurring between the O-rings, to accommodate the discharge of fluid through passages 48.

It will be noted that in the construction contemplated the O-rings function not only as seals but also as valves. When pressure fluid is first admitted against one side of the piston, and the pressure fluid is not sufficient to cause deformation of the O-ring adjacent this side, the O-ring effectively seals off the inner ends of the passages connecting with that particular side to prevent any leakage around the O-ring. Continued pressure build-up only serves to move the O-ring toward its associated backup ring, with the passages in this instance connecting to a void spaced on the side of the O-ring which is already under pressure. In this way, leakage from the pressurized side of the piston-cylinder to the nonpressurized side is prevented.

While an embodiment of the invention has been described, it is not intended to be limited to the particular parts and arrangement shown, as it is desired to cover all modifications and variations which should be apparent to one skilled in the art and that come within the scope of the appended claims.

It is claimed and desired to secure by Letters Patent:

1. A fluid motor comprising a cylinder and a piston movable longitudinally in said cylinder, said piston having around the circumference thereof a cylindrical contact surface contacting the inner surface of said cylinder and centering the piston in the cylinder, a pair of ring retaining grooves on axially opposite sides of said contact surface, one adjacent each side of said piston, a double acting sealing ring mounted in each of said grooves, each of said sealing rings having, when in a relaxed state, radially inner and outer sealing surface portions in sealing engagement with the base of the groove mounting the ring and the inner surface of said cylinder, respectively, the latter surface portions of each ring being spaced axially intermediate the axially opposite sides of the ring, and pressure relief passage means for each groove having an inlet connecting with the base of the groove and an outlet connecting with the side of the piston adjacent the groove, said inlet being spaced from the axially inner side wall of the groove a distance equal approximately to the axial spacing between the axially inner side of the ring mounted in the groove and the radial inner sealing surface portion of the ring, said inlet being closed by the radial inner surface portion of the ring with the ring in a relaxed state.

2. A piston adapted to be reciprocated in a cylinder comprising a substantially cylindrical piston body, said body having intermediate axially opposite sides thereof a cylindrical contact surface for centering and supporting the piston in a cylinder, and an annular groove spaced axially outwardly to each side of said contact surface, each groove being bounded along its axially outer side by a retainer flange, each retainer flange having radially outer edge portions spaced radially inwardly of said contact surface; a flat faced backup ring mounted in each groove tightly against the side wall of the groove adjacent said contact surface, a double acting sealing ring mounted in each groove axially outwardly of the backup ring in the groove, each of said sealing rings having, when in a relaxed state, a sealing radially inner surface portion in sealing engagement with the base of the groove mounting the ring, the latter surface portion of each ring being spaced axially intermediate the axially opposite sides of the ring, and pressure relief passage means for each groove formed in said piston body having an inlet connecting with the base of the groove and an outlet connecting with the side of the piston adjacent the groove, said inlet being spaced from the axially outer face of the backup ring in the groove a distance equal approximately to the axial spacing between the axially inner side of the ring mounted in the groove and the sealing radial inner surface portion of the ring, said inlet being closed by the radial inner surface portion of the ring with the ring in a relaxed state.

3. A fluid motor comprising a cylinder and a piston movable longitudinally in said cylinder, said piston having around the circumference thereof a cylindrical contact surface contacting the inner surface of said cylinder and centering the piston in the cylinder, a pair of ring retaining grooves on axially opposite sides of said contact surface, one adjacent each side of said piston, a resilient elastic sealing ring having normally, when in a relaxed state, approximately a circular cross section mounted in each of said grooves, each of said rings having radially inner and outer surface portions in sealing engagement, when in a relaxed state, with the base of the groove mounting the ring and the inner surface of said cylinder, respectively, and pressure relief passage means for each groove having an inlet connecting with the base of the groove and an outlet connecting with the side of the piston adjacent the groove, said inlet being spaced from the axially inner side wall of the groove a distance equal to approximately the radius of the cross section of the sealing ring mounted in the groove, said inlet being closed by the radial inner surface portion of the ring with the ring in a relaxed state.

4. A piston adapted to be reciprocated in a cylinder comprising a substantially cylindrical body, said body having intermediate axially opposite sides thereof a cylindrical contact surface for supporting said body in a cylinder, and an annular groove spaced axially outwardly to each side of said contact surface, each groove being bounded along its axially outer side by a retainer flange, each retainer flange having radially outer edge portions spaced radially inwardly of said contact surface, a flat faced backup ring mounted in each groove tightly against the side wall of the groove adjacent said contact surface, a resilient elastic sealing ring having normally, when in a relaxed state, approximately circular cross section mounted in each groove axially outwardly of the backup ring in the groove, each sealing ring having a radially inner surface portion in sealing engagement, when in a relaxed state, with the base of the groove mounting the ring, and pressure relief passage means for each groove formed in said body having an inlet connecting with the base of the groove and an outlet connecting with the side of the piston adjacent the groove, said inlet being spaced from the axially outer face of the backup ring in the groove a distance equal to approximately the radius of the cross section of the sealing ring mounted in the groove, said inlet being closed by the radial inner surface portion of the ring with the ring in a relaxed state.

References Cited in the file of this patent

UNITED STATES PATENTS

| | | |
|---|---|---|
| 2,392,182 | Payne | Jan. 1, 1946 |
| 2,520,306 | Detweiler | Aug. 29, 1950 |
| 2,615,767 | Barnes et al. | Oct. 28, 1952 |